US011201897B1

(12) United States Patent
Miseiko (10) Patent No.: US 11,201,897 B1
(45) Date of Patent: Dec. 14, 2021

(54) SECURE MULTIPLEXED ROUTING

(71) Applicant: Rapid7, Inc., Boston, MA (US)

(72) Inventor: Paul Miseiko, Mississauga (CA)

(73) Assignee: Rapid7, Inc., Boston, MA (US)

( * ) Notice: Subject to any disclaimer, the term of this patent is extended or adjusted under 35 U.S.C. 154(b) by 192 days.

(21) Appl. No.: 16/558,485

(22) Filed: Sep. 3, 2019

(51) Int. Cl.
*G06F 15/16* (2006.01)
*H04L 29/06* (2006.01)
*H04L 29/12* (2006.01)
*H04L 29/08* (2006.01)

(52) U.S. Cl.
CPC ........ *H04L 63/166* (2013.01); *H04L 61/6063* (2013.01); *H04L 63/02* (2013.01); *H04L 67/1038* (2013.01)

(58) Field of Classification Search
CPC ... H04L 63/166; H04L 61/6063; H04L 63/02; H04L 67/1038
USPC .......................................................... 726/11
See application file for complete search history.

(56) References Cited

U.S. PATENT DOCUMENTS

| | | | |
|---|---|---|---|
| 10,193,864 B2 * | 1/2019 | Toy | H04L 67/1097 |
| 10,430,263 B2 * | 10/2019 | Polar Seminario | G06F 11/1441 |
| 10,484,334 B1 * | 11/2019 | Lee | H04L 63/0245 |
| 10,492,102 B2 * | 11/2019 | Raleigh | H04L 69/18 |
| 10,542,097 B2 * | 1/2020 | Agarwal | H04L 67/10 |
| 10,623,390 B1 * | 4/2020 | Rosenhouse | H04L 61/2525 |
| 10,680,945 B1 * | 6/2020 | Ye | H04L 12/4641 |
| 10,708,233 B2 * | 7/2020 | Goyal | H04L 63/1408 |
| 10,721,214 B2 * | 7/2020 | Bhat | G06F 21/6218 |
| 10,771,351 B2 * | 9/2020 | Douglas | H04L 41/5077 |
| 10,778,684 B2 * | 9/2020 | Gupta | H04L 63/0815 |
| 10,791,118 B2 * | 9/2020 | Konda | H04L 9/3263 |
| 10,805,104 B2 * | 10/2020 | Chen | H04W 4/70 |
| 10,805,352 B2 * | 10/2020 | Ithal | H04L 63/0428 |
| 10,826,905 B2 * | 11/2020 | Gujarathi | H04L 67/2838 |
| 10,841,336 B2 * | 11/2020 | Cahana | H04L 63/166 |
| 10,848,974 B2 * | 11/2020 | Bachmutsky | G06F 9/45558 |
| 10,887,380 B2 * | 1/2021 | Pahwa | H04L 67/1029 |
| 10,904,342 B2 * | 1/2021 | Tollet | H04L 67/141 |
| 10,911,409 B2 * | 2/2021 | Wang | H04L 63/166 |
| 10,944,836 B2 * | 3/2021 | Olds | H04L 41/5058 |
| 10,951,589 B2 * | 3/2021 | Neystadt | H04L 61/304 |
| 10,958,625 B1 * | 3/2021 | Thornewell | H04L 63/029 |
| 10,977,140 B2 * | 4/2021 | Hu | H04L 67/1031 |
| 10,997,303 B2 * | 5/2021 | Kraft | G06F 21/606 |
| 2019/0149538 A1 * | 5/2019 | Friel | H04L 63/0281 726/6 |
| 2020/0076902 A1 * | 3/2020 | Huang | G06F 9/45558 |
| 2020/0162432 A1 * | 5/2020 | Ludin | H04L 63/20 |

(Continued)

OTHER PUBLICATIONS

N. Bitar, S. Gringeri and T. J. Xia, "Technologies and protocols for data center and cloud networking," in IEEE Communications Magazine, vol. 51, No. 9, pp. 24-31, Sep. 2013, doi: 10.1109/MCOM. 2013.6588646. (Year: 2013).*

(Continued)

*Primary Examiner* — Melvin H Pollack
(74) *Attorney, Agent, or Firm* — Ashwin Anand (57) ABSTRACT

Methods and systems for managing data transmissions. The methods disclosed herein may involve receiving requests for a first and a second service, and routing communications with the second service through the first service without requiring the firewall to be reconfigured to allow communications with the second service.

20 Claims, 8 Drawing Sheets

(56) References Cited

U.S. PATENT DOCUMENTS

2020/0236114 A1* 7/2020 Patil .................. G06F 21/31
2020/0366717 A1* 11/2020 Chaubey ............ H04L 63/0236

OTHER PUBLICATIONS

Marcelo R. Nascimento, Christian E. Rothenberg, et al. 2011. Virtual routers as a service: the RouteFlow approach leveraging software-defined networks. Proceedings of the 6th International Conference on Future Internet Technologies (CFI '11). Association for Computing Machinery, New York, NY, 34-37. (Year: 2011).*

F. Liu, W. Guo, Z. Q. Zhao and W. Chou, "SaaS Integration for Software Cloud," 2010 IEEE 3rd International Conference on Cloud Computing, 2010, pp. 402-409, doi: 10.1109/CLOUD.2010.67. (Year: 2010).*

Justine Sherry, Shaddi Hasan, Colin Scott, Arvind Krishnamurthy, Sylvia Ratnasamy, and Vyas Sekar. 2012. Making middleboxes someone else's problem: network processing as a cloud service. <i>SIGCOMM Comput. Commun. Rev.</i> 42, 4 (Oct. 2012), 13-24. DOI:https://doi.org/10.1145/2377677.2377680 (Year: 2012).*

H. Yamauchi, A. Nakao, M. Oguchi, S. Yamamoto and S. Yamaguchi, "A Study on Service Identification Based on Server Name Indication Analysis," 2019 Seventh International Symposium on Computing and Networking Workshops (CANDARW), 2019, pp. 470-474, doi: 10.1109/CANDARW.2019.00089. (Year: 2019).*

Polk, T., McKay, K., & Chokhani, S. (2014). Guidelines for the selection, configuration, and use of transport layer security (TLS) implementations. NIST special publication, 800(52), 32. (Year: 2014).*

Eastlake, D. "Transport Layer Security (TLS) Extensions: Extension Definitions," RFC 6066, Jan. 2011 (Year: 2011).*

Hoffman, P. and Schlyter, J. "The DNS-Based Authentication of Named Entities (DANE) Transport Layer Security (TLS) Protocol: TLSA," RFC 6698, Aug. 2012. (Year: 2012).*

Saint-Andre, P. and Hodges, J. "Respresentation and Verification of Domain-Based Application Service Identity Within Internet Public Key Infrastructure using X.509 (PKIX) Certificates in the context of Transport Layer Security (TLS)," RFC 6125, Mar. 2011. (Year: 2011).*

Rescorla, E. "The Transport Layer Security (TLS) Protocol Version 1.3," RFC 8446, Aug. 2018. (Year: 2018).*

Brown, M. and Housley, R. "Transport Layer Security (TLS) Authorization Extensions," RFC 5878, May 2010. (Year: 2010).*

* cited by examiner

SECURE MULTIPLEXED ROUTING

TECHNICAL FIELD

Embodiments described herein relate generally to methods and systems for managing data transmissions and more specifically to securely routing data transmissions.

BACKGROUND

"Firewalls" are technological measures used to prevent unauthorized communications between computers on different computer networks. Some firewalls require configuration to permit communications between computers on different computer networks; these configurations are colloquially referred to as "holes" in the firewall, continuing the analogy.

Organizations typically want to minimize the number of holes they create in their firewalls—each hole reduces organizational security, requires administrator time and effort, etc. However, the introduction of certain services or vendor products to a network may require reconfiguring the firewall to allow for multiple endpoints or services. This problem is magnified when the services or products are controlled by the third party, who typically does not have permission to manage their customer's firewall.

This at the very least inconveniences the service provider or vendor, as they have to take the time to instruct their client to modify their firewall. The client then has to expend resources to make the required modifications to allow for subsequent data transmissions, assuming they agree to do so. In some cases, the client may have to seek and obtain internal and/or regulatory approval to make the required change.

A need exists, therefore, for more effective systems and methods for managing data transmissions.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method of managing data transmissions. The method includes receiving a request for a first service at a router, wherein the request for the first service originates inside a firewall and the first service executes outside the firewall; receiving a request for a second service at the router, wherein the request for the second service originates inside the firewall and the second service executes outside the firewall; and routing, using the router, communications with the second service through the first service without requiring the firewall to be reconfigured to allow the communications with the second service.

In some embodiments, communications for the first service and the communications for the second service are transport layer security (TLS) communications. In some embodiments, each communication comprises a server name indication (SNI) field, and the SNI field of each communication specifies the second service.

In some embodiments, the router is a load balancer.

In some embodiments, the communications for the second service are routed without decryption.

In some embodiments, the second service is a cloud storage service. In some embodiments, the cloud storage service is specified in either a host header or a URL associated with the request for the second service.

According to another aspect, embodiments relate to a system for managing data transmissions. The system includes an interface for at least receiving: a request for a first service at a router, wherein the request for the first service originates inside a firewall and the first service executes outside the firewall, and a request for a second service at the router, wherein the request for the second service originates inside the firewall and the second service executes outside the firewall; and a router configured to route communications with the second service through the first service without requiring the firewall to be configured to allow the communications with the second service.

In some embodiments, the communications for the first service and the communications for the second service are transport layer security (TLS) communications. In some embodiments, each communication comprises a server name indication (SNI) field, and the SNI field of each communication specifies the second service.

In some embodiments, the router is a load balancer.

In some embodiments, the communications for the second service are routed without decryption.

In some embodiments, the second service is a cloud storage service. In some embodiments, the cloud storage service is specified in either a host header or a URL associated with the request for the second service.

According to yet another aspect, embodiments relate to a method for routing communications without requiring firewall configuration. The method includes receiving a transport layer security (TLS) communication at a router, the communication comprising a server name indication (SNI) field, wherein the TLS communication originates inside a firewall and the router is outside the firewall; and routing, using the router, the TLS communication to a destination specified in the SNI field.

In some embodiments, the destination specified refers to a backend service.

In some embodiments, the SNI field multiplexes a plurality of platform services via the router.

In some embodiments, the TLS communication is routed without decryption.

In some embodiments, the destination refers to a cloud storage service.

In some embodiments, receiving the TLS communication includes intercepting the TLS communication, and the method further includes validating the cloud storage service.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Even though servers are typically designated by a single IP address, they may actually be hosting thousands of different domain names. To address this problem, website queries in the 1990s added a host field that tells a server which of the domains that it hosts is the intended recipient for the query. This proved to be an important advance for HTTP.

In 2003, Server Name Indication (SNI) was introduced as an extension to the Transport Layer Security (TLS) protocol to allow clients to identify the host they are attempting to connect to as part of the handshake process. Specifically, SNI is a header in the TLS protocol that allows a TLS request to specify the desired host's name. This enables a server to host several web sites or services on the same network address or port, akin to a web server that that hosts multiple domains at the same IP address.

In order to provide the name of the server of interest, clients could use an extension of type "server_name" in the initial step of the handshake process. In fact, RFC 3546 recommended that clients include an extension of type "server_name" in the "Client Hello" message whenever they attempt to locate a server by a supported name type. A server that receives a message containing the "server_name" extension may use the data contained in the extension to select the appropriate SSL certificate to return to the client.

As discussed above, clients are at the very least inconvenienced when required by service providers or vendors to reconfigure their firewall. These clients may need to modify their firewall to allow for new or otherwise previously non-allowed endpoints, which are typically defined by a combination of a host name and an IP address. Occasionally, an endpoint is further defined by a port such as a TCP port.

To address this problem, Applicant has implemented SNI routing techniques in the realm of data transmission to multiplex multiple platform services via a single routing service. The results are systems and methods that can route new or otherwise previously unconfigured services via an existing backend service.

Embodiments of the present invention achieve another benefit in that the systems and methods described herein know which endpoint (e.g., an API endpoint) is of interest without requiring any decryption of the messages intended for that endpoint. This improves connection security and transmission speed, as the messages can be routed on, e.g., a byte-by-byte basis, without decrypting the messages prior to routing.

Accordingly, the systems and methods described herein may multiplex a plurality of services to multiple endpoints from a single backend service. These techniques may be used for transmitting data to various virtual machines hosted in cloud storage services such as AMAZON S3 and other types of services whether available now or created hereafter.

In a typical client-vendor scenario, a client may be given the following documentation when setting up a vendor product to use some vendor service:

TABLE 1

Vendor Documentation

| Data type | Region | Destination | Port |
| --- | --- | --- | --- |
| Agent messages and beacons | United States | endpoint.ingress.vendor.com | 443 |
| | Canada | ca.endpoint.ingress.vendor.com | 443 |
| | Europe | eu.endpoint.ingress.vendor.com | 443 |
| | Japan | ap.endpoint.ingress.vendor.com | 443 |
| | Australia | au.endpoint.ingress.vendor.com | 443 |
| Agent file uploads for collection and updated downloads | United States | s3.amazonaws.com | 443 |
| | Canada | s3.ca-central-1.amazonaws.com | 443 |
| | Europe | s3.eu-central-1.amazonaws.com | 443 |
| | Japan | s3.ap-northeast-1.amazonaws.com | 443 |
| | Australia | s3.ap.southeast-2.amazonaws.com | 443 |

The "Agent messages and beacons" data type represent vendor command and control protocols. This data type may specify that an agent beacons periodically, essentially as a check-in. The messages aspect specifies that small messages (e.g., less than 256 KB) can go through this pipeline to specify events, such as when a user logs into their laptop.

The "Agent file uploads for collection and update downloads" data type concern larger collections. These may relate to, for example, collecting data specifying applications installed on a device.

Table 1 also includes a list of domain names, where each domain name may be backed by several IP addresses, as well as the involved ports. This data may be relevant for clients when configuring their firewalls to enable them to use the service(s) specified in the "Destination" column. However, a client would therefore have to reconfigure their firewall to open the specified port (i.e., port 443) to allow the service.

The "Agent file upload . . . " portion of Table 1 may relate to exemplary cloud storage services (e.g., AMAZON S3). These are endpoints that clients may be hesitant to permit through their firewalls as these hosts may be associated with malware or other malicious software in addition to legitimate software applications and services.

Figure 1A:
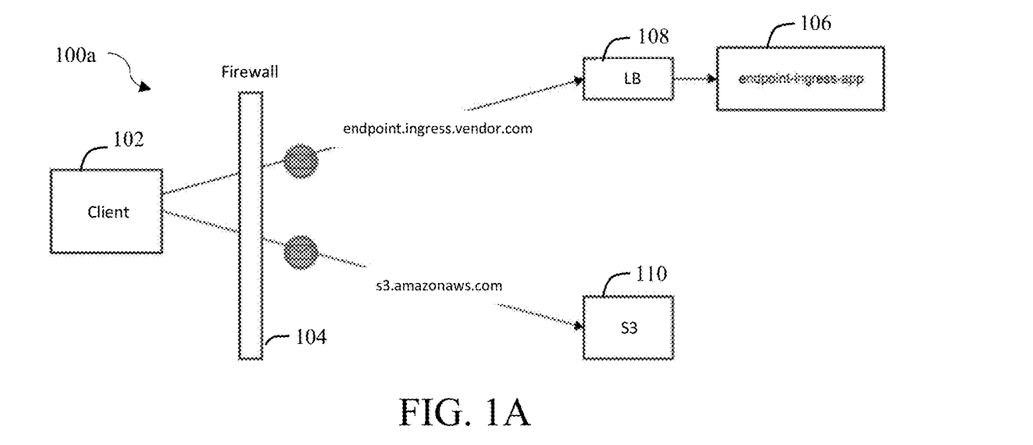
FIGS. 1A and B illustrate exemplary network diagrams in which a client would be required to reconfigure their firewall to accommodate a new service.

FIG. 1A illustrates an exemplary network diagram 100a based on Table 1, above. Specifically, FIG. 1 illustrates a client 102 behind a firewall 104. In this scenario, the internet targets may be TCP endpoint.ingress.vendor.com:443 and TCP s3.amazonaws.com:443. These endpoints are shown as endpoint-ingress-app 106, which is managed by a load balancer 108, and an S3 endpoint 110.

FIG. 1A illustrates the firewall 104 configured to allow both endpoints 106 and 110. However, if the client 102 needs to add a new public facing service known as TCP bootstrap (e.g., at the instruction of a vendor), the client 102 would need to configure a new target permitted through the firewall: TCP boostrap.vendor.com:443.

Figure 1B:
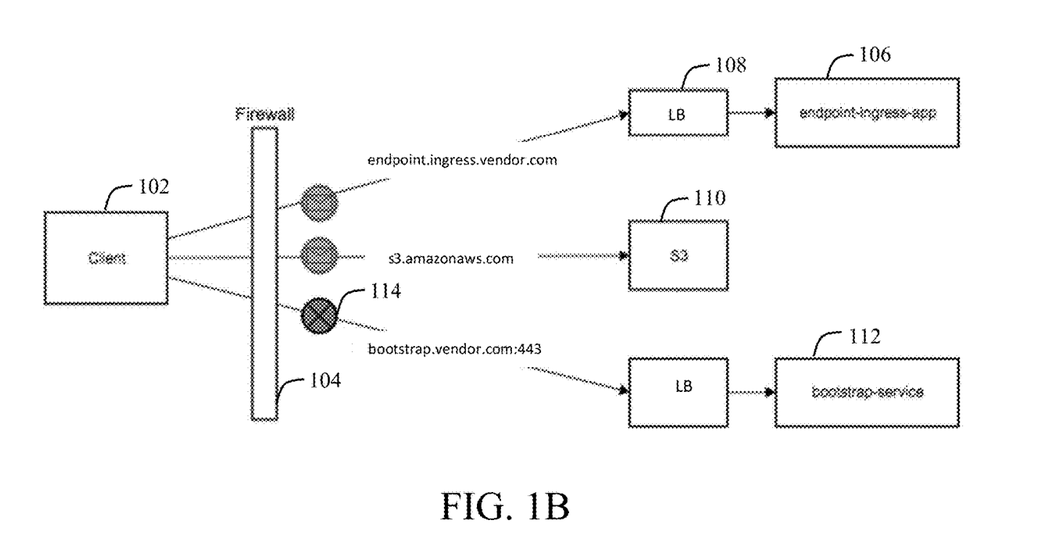

FIG. 1B illustrates an updated network diagram 100b that illustrates this new target. As illustrated, the firewall 104 would have to be updated, as the firewall 104 does not initially allow the bootstrap-service 112 as indicated by "X" 114.

As discussed previously, this may inconvenience both the vendor and the client 102. The vendor would have to, for example, call or email the client 102 to instruct them to update their firewall 104. This is time consuming for the vendor, as the vendor may have to communicate instructions to potentially hundreds of clients.

Additionally, there is no guarantee that the client 102 would receive or actually even read this email, much less follow the instructions. If they fail to review the instructions (or fail to act on the instructions), future services may fail.

Even if the client 102 intended to comply with the instructions, they may have to follow certain internal procedures such as submitting a request to their IT department to configure the firewall 104. The client 102 may also have to ensure they comply with any regulatory requirements in adjusting their firewall 104.

Accordingly, the systems and methods described herein overcome these problems by using SNI-based routing techniques to transparently route to a variety of endpoints without modifying any existing code or services. That is, the systems and methods herein do not need to add a particular service to, for example, perform file transfer procedures. Rather, agents can use the SNI header to communicate with the desired service through an SNI-based router.

Figure 2:
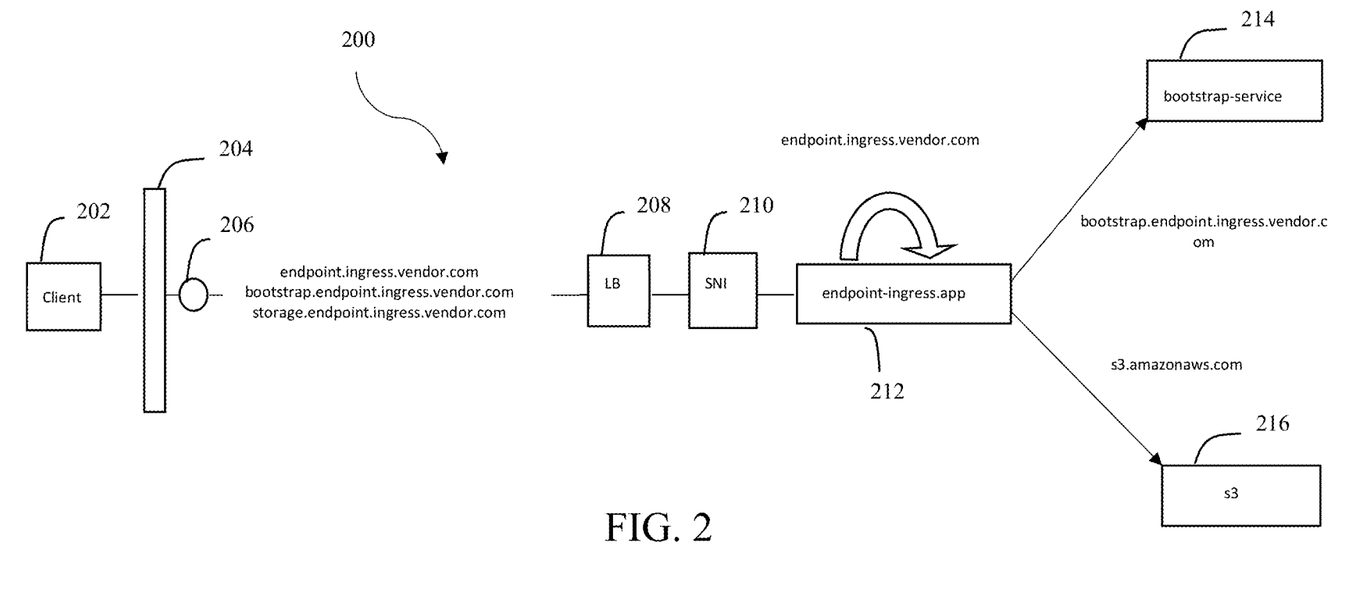
FIG. 2 illustrates an exemplary network diagram in accordance with one embodiment.

FIG. 2 illustrates a network diagram 200 in accordance with one embodiment. The network diagram 200 of FIG. 2 addresses the above disadvantages, as the diagram 200 illustrates the use of SNI-routing techniques so that a client does not need to reconfigure their firewall.

FIG. 2 illustrates a client 202 in operable connectivity with firewall 204. A data transmission 206 directed to "endpoint.ingress.vendor.com" may specify one of a variety of endpoints such as endpoint.ingress.vendor.com, bootstrap.endpoint.ingress.vendor.com, and storage.endpoint.ingress.vendor.com in one or more fields of the transmission, such as the SNI field discussed above. In reality there may be many more domains to be communicated with through the firewall. The network diagram also shows a load balancer 208 and an SNI router 210.

The endpoint-ingress.app 212 may execute on SNI router 210 and process inbound communications. The self-directing arrow indicates that this endpoint 212 can service requests to "endpoint.ingress" and that no routing has to occur. In other words, any SNI extension or header addressing "endpoint.ingress" is received and serviced by this endpoint 212.

FIG. 2 also shows the bootstrap-service 214 and the S3 service 216 in communication with the endpoint-ingress.app 212. The endpoint-ingress.app 212 is configured to route messages designating these services to these endpoints. Because endpoint.ingress.vendor.com and bootstrap.endpoint.ingress.vendor.com share the same load balancer 208, those DNS records will resolve to the same IPs. Accordingly, customers need not update their firewall rules to permit communications with bootstrap.endpoint.ingress.vendor.com, as communications to endpoint.ingress designating bootstrap in the SNI field will be processed by the router 210 and forwarded to bootstrap-service 214.

Figure 3:
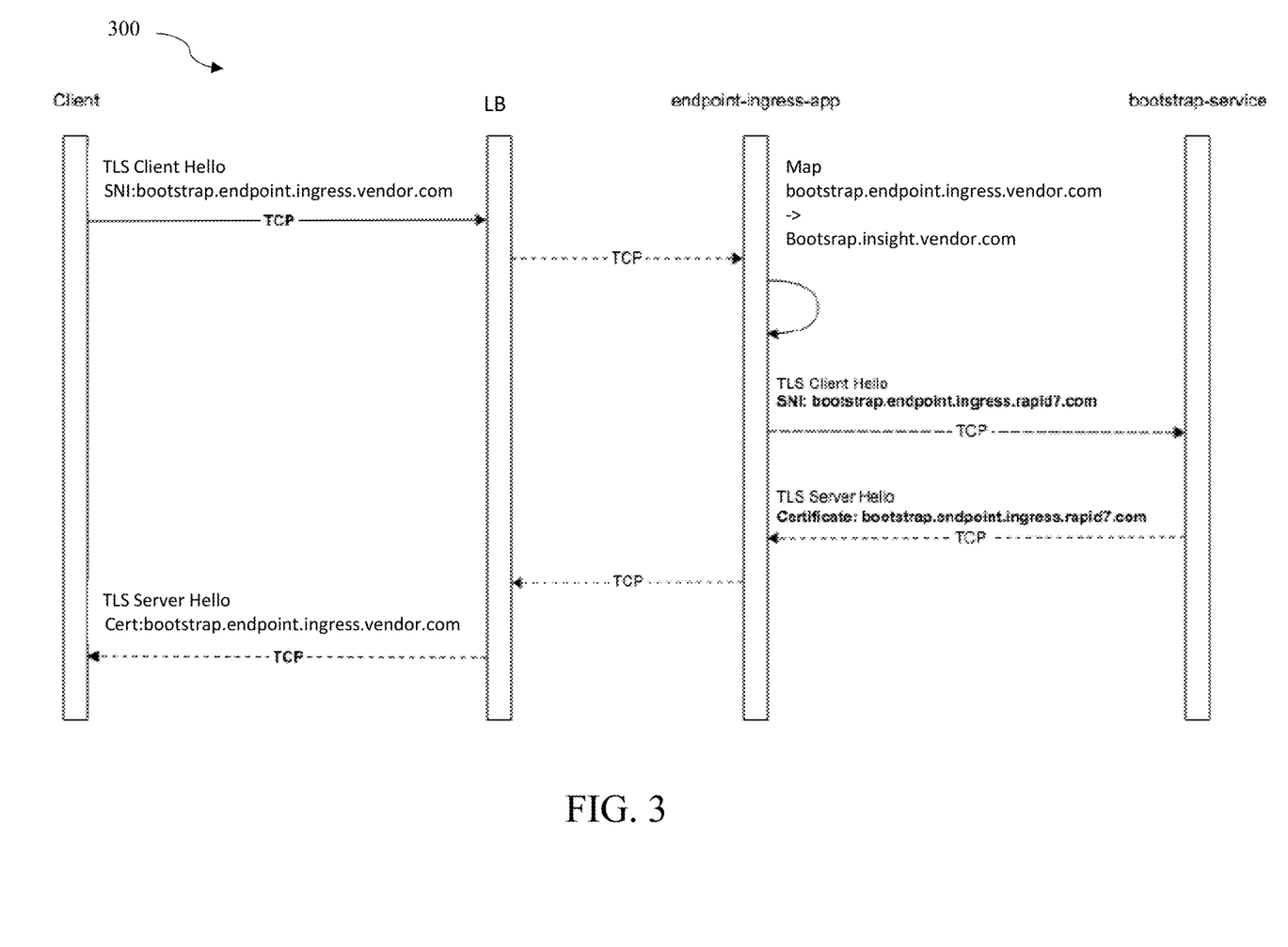
FIG. 3 illustrates an exemplary handshake process related to the diagram of FIG. 2 in accordance with one embodiment.

FIG. 3 illustrates an exemplary handshake process 300 related to the diagram 200 of FIG. 2. First, a message comes in from a client (e.g., "Client Hello" to endpoint-ingress designating "bootstrap.endpoint.ingress.vendor.com" for communication) and is communicated to the load balancer (LB). In this case, bootsrap.endpoint.ingress.vendor.com is the inbound SNI header value.

The LB then establishes a TCP connection to endpoint-ingress-app, which consults a map file to determine how to direct the inbound communication. For example, the map file may specify a service for receiving the message given a particular designated domain. This routing may utilize DNS.

As seen in FIG. 3, bootstrap.endpoint.ingress.vendor may be mapped to bootstrap.insight.vendor.com by endpoint-ingress-app, which then forwards the TLS Client Hello originating with the client to the bootstrap-service at boostrap.endpoint.ingress.rapid7.com. The bootstrap-service may receive the communication and, in response, provide the certificate for bootstrap.endpoint.ingress.vendor.com in a TLS Hello message. As can be deduced from the above discussion and FIG. 3, endpoint-ingress-app does not provide a response but only acts as a router. However, the returned certificate via endpoint-ingress-app is for bootsrap.endpoint.ingress.vendor.com, which is what the client originally requested.

As discussed above, clients are often hesitant to allow their firewalls to accommodate third party cloud storage services without restrictions. This often is because cloud storage services are associated with or otherwise enable the spread of malware or other malicious software. Specifically, cloud storage services are often leveraged by threat actors as a data storage medium, thereby allowing the cheap and fast uploading of sensitive user data from compromised computers.

Some product vendors may be invested in the use of these cloud storage services, however, and are therefore hesitant to stop using them entirely. These product vendors ensure that only their designated buckets can be leveraged and then rely on the buckets' access control lists to ensure proper security.

Figure 4:
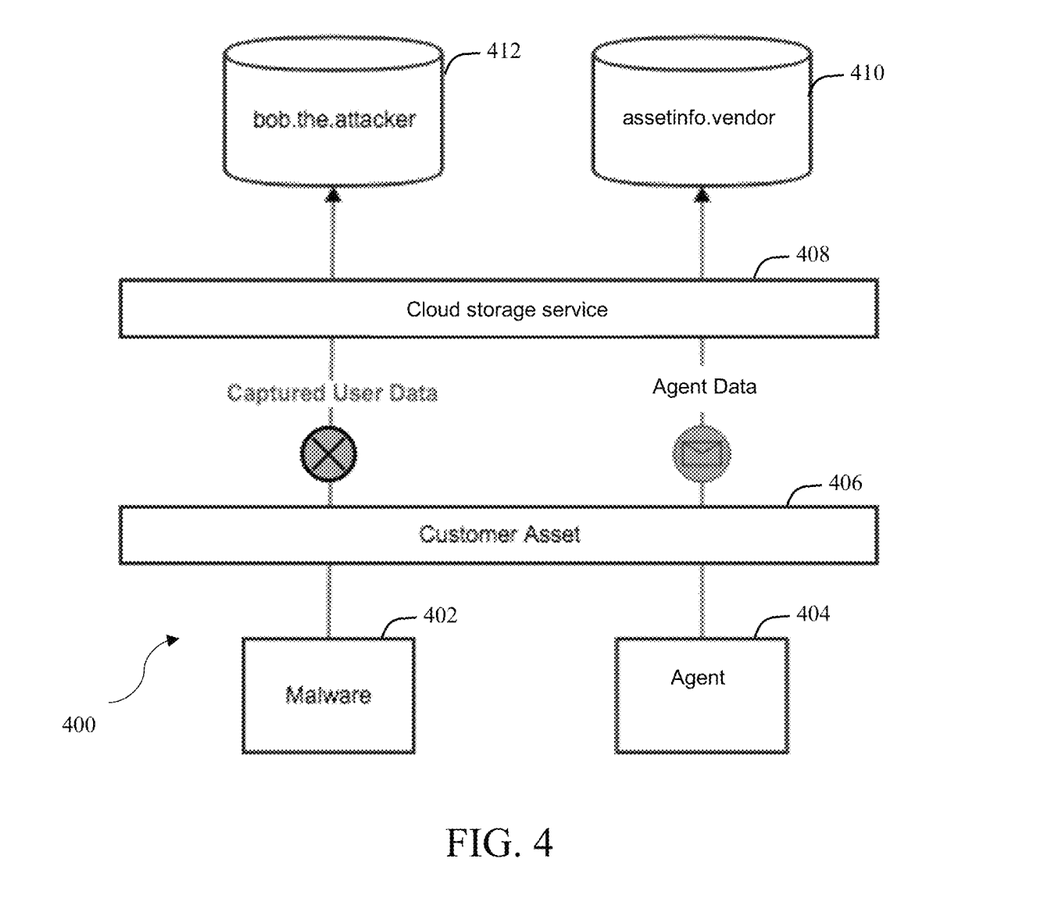
FIG. 4 illustrates an exemplary network diagram indicating potential security flaws associated with existing network configurations.

This potential security problem is illustrated in FIG. 4. Network diagram 400 illustrates both malware 402 and a legitimate agent 404 executing on a customer asset 406. That malware 402 may, for example, gather sensitive information related to one or more users associated with the customer. Similarly, the agent 404 may be authorized to gather certain agent data from the customer asset 406, and store this data on a cloud storage service 408 for later retrieval by vendor 410.

If a customer wanted to use the agent 404, they would have to whitelist the cloud storage service 408. Having done so, malware 402 could also access the cloud storage service 408 through the customer's firewall and other measures, storing information for later retrieval by the attacker 412.

The systems and methods described herein overcome this problem by intercepting client-side requests to the cloud storage service, validating (or rejecting) the requested bucket within the cloud storage service, and thus ensuring that only pre-approved buckets can be requested. The systems and methods described herein may use a host header or URL segment to specify the bucket and an intermediary to decode the request before routing and thereby facilitating the connection.

Figure 5:
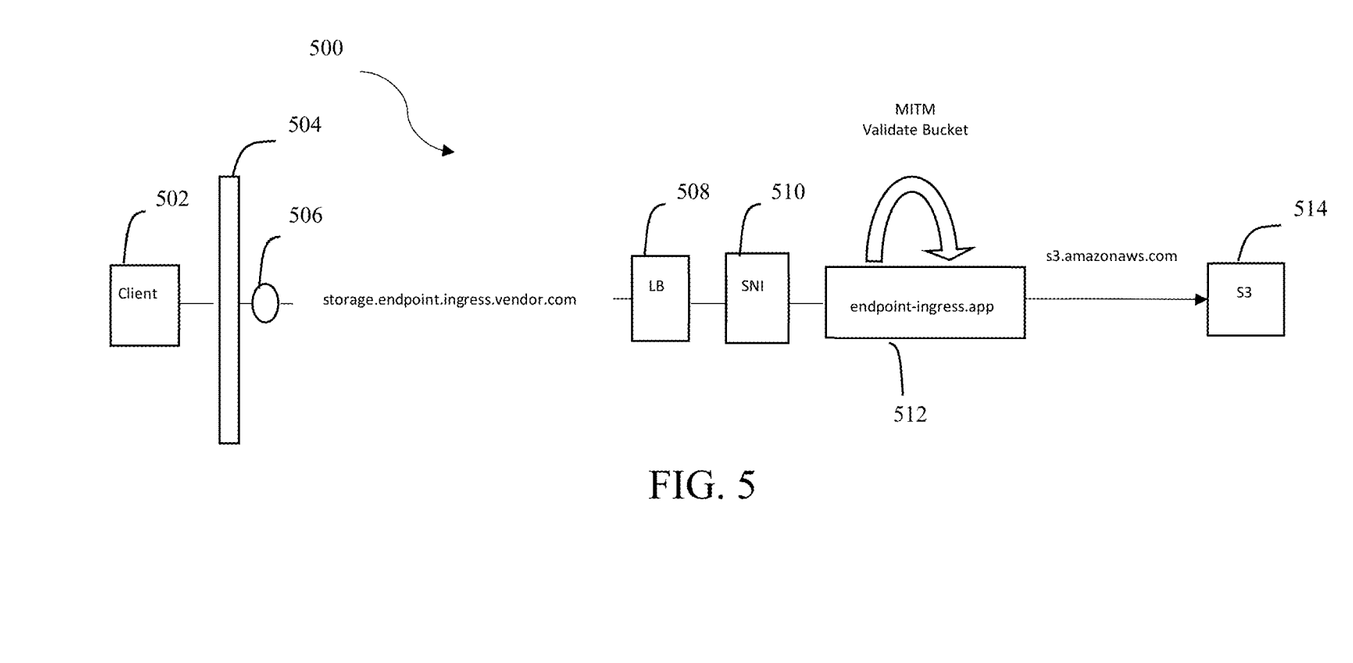
FIG. 5 illustrates a proxying workflow to address the potential security flaws of FIG. 4 in accordance with one embodiment.

FIG. 5 illustrates a proxying workflow 500 in accordance with one embodiment. Specifically, FIG. 5 illustrates a workflow 500 using S3 proxying. As in previous figures, FIG. 5 illustrates a client 502 in operable connectivity with a firewall 504, a transmitted message 506, load balancer 508, and an SNI-based router 510.

From the client's perspective, they issue a request to https://storage.endpoint.ingress.vendor.com. That is, they would not issue a request to https://s3.amazonaws.com. Therefore, the client 502 would not observe or need to permit traffic to the S3 service 514. After handling by the load balancer 508, the SM router 510 receives the request and parses the SNI header in the request to identify that the client 502 wants to communicate with storage.endpoint.ingress.vendor.com, and maps this domain to endpoint-ingress.app 512. Endpoint-ingress app 512 in turn routes this communication to S3 service 514 for storage after validating the bucket.

Figure 6:
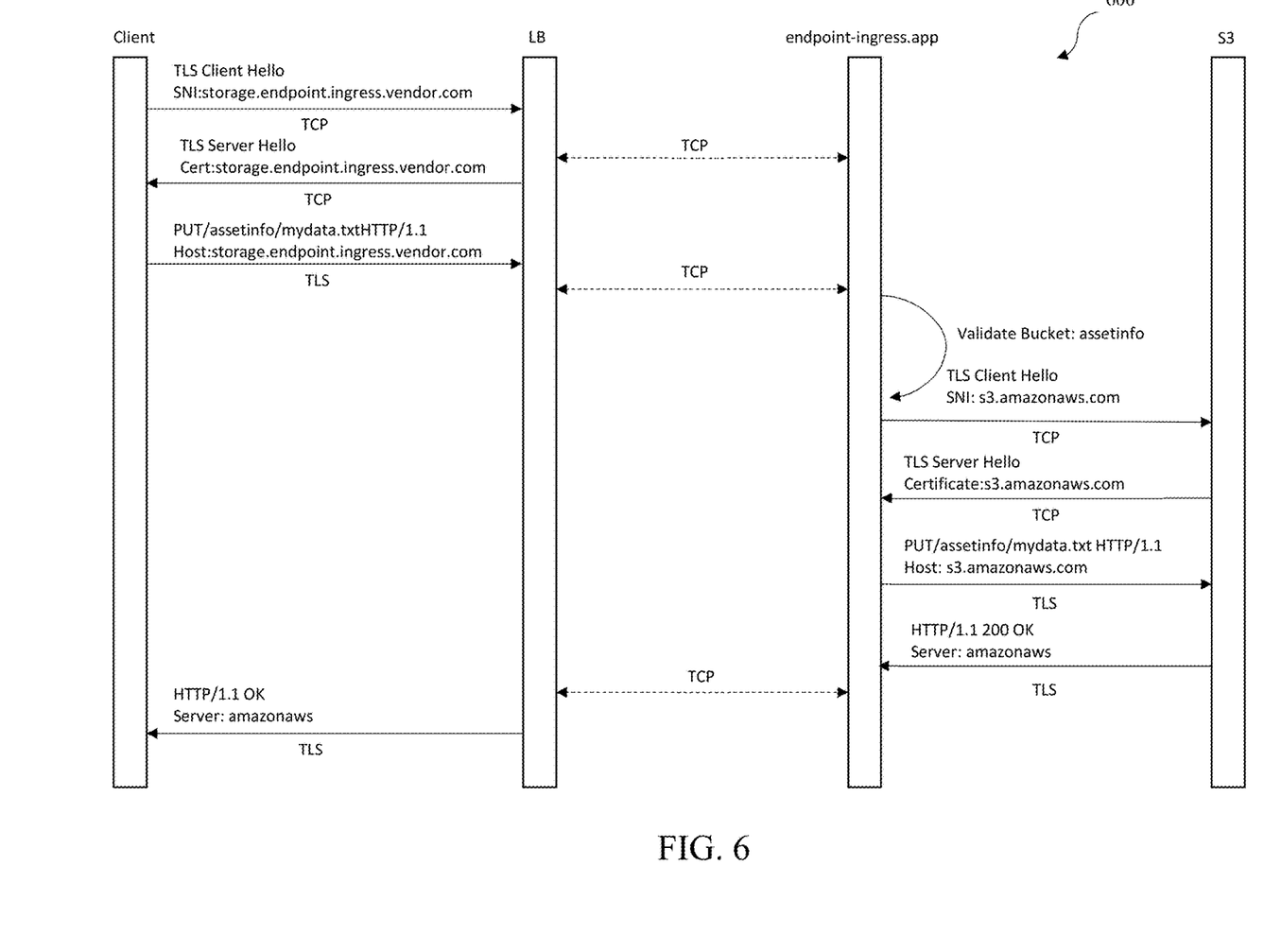
FIG. 6 illustrates an exemplary handshake process associated with the proxying workflow of FIG. 5 in accordance with one embodiment.

FIG. 6 illustrates an exemplary handshake process 600 corresponding to the proxying workflow 500 of FIG. 5 in accordance with one embodiment. That is, this handshake process 600 begins with a client message or request that specifies storage.endpoint.ingress.vendor.com in the SNI header. The load balancer then establishes a TCP connection with endpoint-ingress.app, which validates the appropriate bucket associated with the vendor and returns the SSL certificate for the bucket associated with the requested host in the TLS Server Hello message. Subsequent PUT commands transmits data for storage in the cloud.

Endpoint-ingress.app receives these transmissions from the client via the load balancer, and then performs the bucket validation step to ensure that only vendor-approved buckets are requested. The S3 service can respond and provide the appropriate certificate for s3.amazonaws.com) which is used by endpoint-ingress.app to store data in S3.

Figure 7:
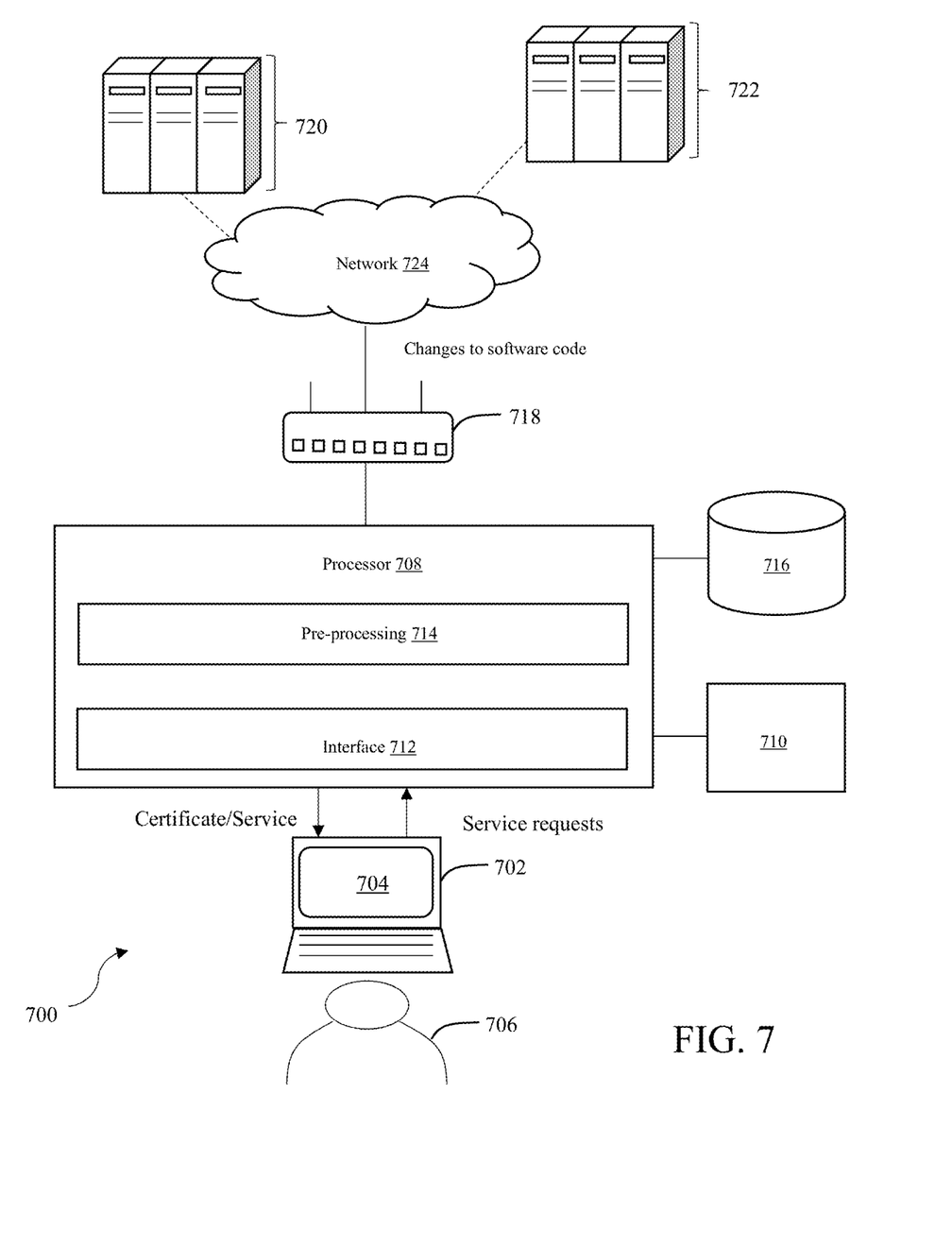
FIG. 7 illustrates a system for managing data transmissions in accordance with one embodiment.

FIG. 7 illustrates a system 700 for managing data transmissions in accordance with one embodiment. The system 700 includes a user device 702 executing a user interface 704 for presentation to one or more users 706 such as a client requesting some service.

The user device 702 may be any hardware device capable of executing the user interface 704. The user device 702 may be configured as a laptop, PC, tablet, mobile device, or the like. The exact configuration of the user device 702 may vary as long as it can execute and present the user interface 704 to the user 706. The user interface 704 may allow the user 706 to request services and associated functionality, as well as review associated services and functionality provided by the requested services.

The user 706 may include an employee of a client tasked with managing an organization's network. This management may require the user 706 to access certain services associated with one or more vendors.

The user device 702 may be in operable communication with one or more processors 708. The processor(s) 708 may be any hardware device capable of executing instructions stored on memory 710 to accomplish the objectives of the various embodiments described herein. The processor(s) 708 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 708 may be configured as part of the user device 702 on which the user interface 704 executes, such as a laptop, or may be located on a different computing device, perhaps at some remote location.

The processor 708 may execute instructions stored on memory 710 to provide various modules to accomplish the objectives of the various embodiments described herein. Specifically, the processor 708 may execute or otherwise include an interface 712 and a pre-processing module 714.

The memory 710 may be L1, L2, or L3 cache or RAM memory configurations. The memory 710 may include non-volatile memory such as flash memory, EPROM, EEPROM, ROM, and PROM, or volatile memory such as static or dynamic RAM, as discussed above. The exact configuration/type of memory 710 may of course vary as long as instructions for managing data transmissions or routing communications without requiring firewall configuration can be executed by the processor 708 to accomplish the objectives of various embodiments described herein.

The interface 712 may be in communication with or otherwise receive service requests from the user 706. The interface 712 may also receive any appropriate information from the requested services, such as certificates.

The pre-processing module 714 may perform any required pre-processing steps on the received requests. For example, these steps may include parsing any data associated with the service requests, as well as analyzing the headers or URLs associated with the received service request(s). In performing these steps, the processor 708 may rely on any appropriate data stored in one or more database(s) 716. This may include data associated with the requested services, for example.

The router 718 may implement the SNI routing techniques discussed above to handle received requests. For example, the interface 712 may receive at least a request for a first service and a request for a second service. These requests may be passed to the router 718. Accordingly, and in accordance with the above discussions, the requests for the first and second services originate inside a firewall and the first and second services execute outside the firewall.

The first and second services 720 and 722 may be accessible over one or more networks 724. The network(s) 724 may link the various assets and organizations with various types of network connections. The network(s) 724 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 724 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

In accordance with the above discussions, the router 718 may route communications with the second service through the first service. Accordingly, clients are not required to reconfigure their firewall (not shown).

Figure 8:
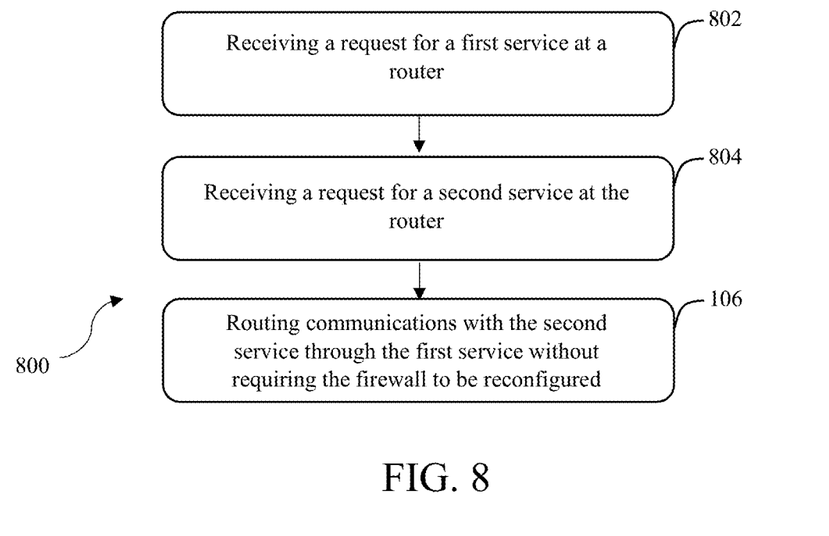
FIG. 8 depicts a flowchart of a method of managing data transmissions in accordance with one embodiment.

FIG. 8 depicts a flowchart of a method 800 of managing data transmissions in accordance with one embodiment. Step 802 involves receiving a request for a first service at a router, wherein the request for the first service originates inside a firewall and the first service executes outside the firewall.

Step 804 involves receiving a request for a second service at the router, wherein the request for the second service originates inside the firewall and the second service executes outside the firewall.

In some embodiments, the second service may be a cloud storage service. The cloud storage may be specified in either a host header or a URL associated with the request for the second service.

Step 806 involves routing, using the router, communications with the second service through the first service without requiring the firewall to be reconfigured to allow the communications with the second service. The communications for the first service and the communications for the second service may be transport layer security communications, for example. As discussed above, each of these communications may comprise an SNI field, and the SNI field of each communication may specify the second service although the communications themselves are addressed to the first service.

The routing may include byte-by-byte routing. That is, the routing may be done without decryption.

Figure 9:
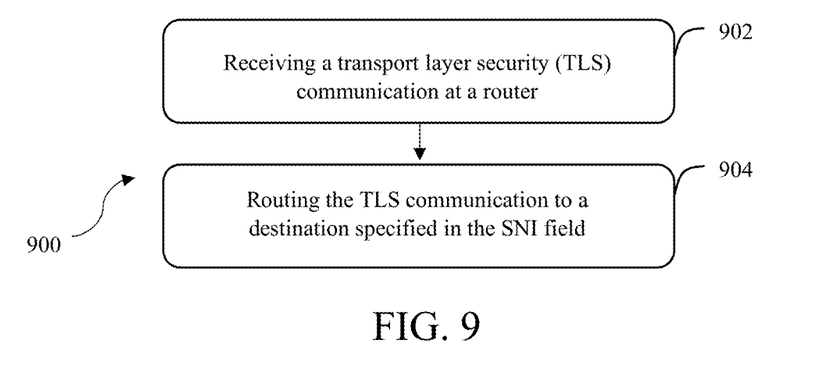
FIG. 9 depicts a flowchart of a method for routing communications without requiring firewall configuration in accordance with one embodiment.

FIG. 9 depicts a flowchart of a method 900 for routing communications without requiring firewall configuration in accordance with one embodiment. Step 902 involves receiving a transport layer security (TLS) communication at a router, the communication comprising a server name indication (SNI) field, wherein the TLS communication originates inside a firewall and the router is outside the firewall.

In some embodiments, receiving the TLS communication may involve intercepting the TLS communication. In these situations, the method may further include validating the service (e.g., a cloud storage service).

Step 904 involves routing, using the router, the TLS communication to a destination specified in the SNI field. The specified destination may refer to a backend service or a cloud storage service, for example. In some embodiments, the SNI field may multiplex a plurality of platform services via the router.

As in method 800, the TLS communication may be routed using byte-by-byte routing. That is, the TLS communication may be routed without decryption.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method of managing data transmissions, the method comprising:
   receiving, by a first request for a first service executing at a router, wherein the first request for the first service originates inside a firewall, the first service executes outside the firewall, and the firewall is configured to allow communications from inside the firewall to the router;
   receiving, by the first service, a second request for a second service, wherein the second request for the second service originates inside the firewall, the second service executes outside the firewall, and the firewall is configured to not allow communications from inside the firewall to the second service;
   determining, by the first service, that the second request is directed to the second service, wherein the determination is made based on a map file that maps a name specified by the second request to the second service;
   sending, by the first service, the second request to the second service; and
   routing, using the router, communications from inside the firewall to the second service, wherein the routing is performed without requiring the firewall to be reconfigured to allow the communications to the second service.

2. The method of claim 1, wherein
the communications to the first service and the communications to the second service are transport layer security (TLS) communications.

3. The method of claim 1, wherein
the second request comprises a server name indication (SNI) field, and
the SNI field specifies the name of the second service.

4. The method of claim 1, wherein
the router is a load balancer.

5. The method of claim 1, wherein
the communications to the second service are routed without decryption.

6. The method of claim 1, wherein
the second service is a cloud storage service.

7. The method of claim 6, wherein
the cloud storage service is specified in either a host header or a URL associated with the second request for the second service.

8. A system for managing data transmissions, the system comprising:
   an interface configured to receive:
      a first request for a first service executing at a router, wherein the first request for the first service originates inside a firewall, the first service executes outside the firewall, and the firewall is configured to allow communications from inside the firewall to the router, and
      a second request for a second service, wherein the second request for the second service originates inside the firewall, the second service executes outside the firewall, and the firewall is configured to not allow communications from inside the firewall to the second service; and
   the router configured to:
      determine, using the first service, that the second request is directed to the second service, wherein the determination is made based on a map file that maps a name specified by the second request to the second service;

send the second request to the second service; and route communications from inside the firewall to the second service, wherein the routing is performed without requiring the firewall to be configured to allow the communications to the second service.

9. The system of claim 8, wherein
the communications to the first service and the communications to the second service are transport layer security (TLS) communications.

10. The system of claim 8, wherein
the second request comprises a server name indication (SNI) field, and the SNI field specifies the name of the second service.

11. The system of claim 8, wherein
the router is a load balancer.

12. The system of claim 8, wherein
the communications to the second service are routed without decryption.

13. The system of claim 8, wherein
the second service is a cloud storage service.

14. The system of claim 13, wherein
the cloud storage service is specified in either a host header or a URL associated with the second request for the second service.

15. A method for routing communications without requiring firewall configuration, the method comprising:

receiving a transport layer security (TLS) communication at a router, the communication comprising a server name indication (SNI) field, wherein the TLS communication originates inside a firewall, the router is outside the firewall, and the firewall is configured to not allow communications from inside the firewall to a destination indicated by the SNI field;

determining, by the router, that the TLS communication is directed to the destination, wherein the determination is made based on a map file that maps a name indicated by the SNI field to the destination; and routing, using the router, the TLS communication to the destination specified in the SNI field.

16. The method of claim 15, wherein
the destination specified refers to a backend service.

17. The method of claim 15, wherein
the SNI field is used to by the router to multiplex a plurality of platform services.

18. The method of claim 15, wherein
the TLS communication is routed without decryption.

19. The method of claim 15, wherein
the destination refers to a cloud storage service.

20. The method of claim 19, wherein
receiving the TLS communication includes intercepting the TLS communication, and the method further includes validating the cloud storage service.

\* \* \* \* \*